(12) United States Patent  
Arcese et al.

(10) Patent No.: US 9,843,652 B2  
(45) Date of Patent: Dec. 12, 2017

(54) CONTEXT SWITCH OF DATABASE CONNECTIONS

(71) Applicant: International Business Machines Corporation, Armonk, NY (US)

(72) Inventors: Mauro Arcese, Rome (IT); Stefano Sidoti, Rome (IT)

(73) Assignee: International Business Machines Corporation, Armonk, NY (US)

( * ) Notice: Subject to any disclaimer, the term of this patent is extended or adjusted under 35 U.S.C. 154(b) by 104 days.

(21) Appl. No.: 14/833,613

(22) Filed: Aug. 24, 2015

(65) Prior Publication Data

US 2016/0057254 A1    Feb. 25, 2016

(30) Foreign Application Priority Data

Aug. 25, 2014   (GB) .................................. 1415023.9

(51) Int. Cl.
```
G06F 15/16      (2006.01)
H04L 29/06      (2006.01)
H04L 29/08      (2006.01)
```
(52) U.S. Cl.
CPC ............ *H04L 67/42* (2013.01); *H04L 67/148* (2013.01); *H04L 67/327* (2013.01)

(58) Field of Classification Search
None
See application file for complete search history.

(56) References Cited

U.S. PATENT DOCUMENTS

| | | |
|---|---|---|
| 6,289,344 B1 | 9/2001 | Braia et al. |
| 6,986,060 B1 | 1/2006 | Wong |
| 7,386,557 B2 | 6/2008 | Barga et al. |
| 7,801,967 B1 | 9/2010 | Bedell et al. |
| 8,484,242 B1 | 7/2013 | Singh et al. |
| 8,549,038 B2 | 10/2013 | Narasinghanallur et al. |
| 2009/0234957 A1 | 9/2009 | Li et al. |
| 2013/0013633 A1 | 1/2013 | Babka et al. |
| 2015/0379293 A1* | 12/2015 | Wang .................. G06F 21/6218 726/7 |

OTHER PUBLICATIONS

"Context Transfer Method through SQL for Database Security," IP.com Disclosure No. IPCOM000137107D, Jun. 8, 2006, 3 pages.
"System Design and architecture for mapping multiple and independent security context based access control in a RDBMS Engine," IP.com Disclosure No. IPCOM000223773D, Nov. 29, 2012, 7 pages.
Mawla, "SQL Server: Understanding and Controlling Connection," The Pythian Group Inc., Oct. 7, 2008, 14 pages. http://www.pythian.com/blog/sql-server-understanding-and-controlling-connection/.

* cited by examiner

*Primary Examiner* — Nam Tran
(74) *Attorney, Agent, or Firm* — Yee & Associates, P.C.; Stephen R. Yoder

(57) ABSTRACT

A solution is proposed for accessing a database by an application client. A corresponding method comprises receiving a connection command for opening a user connection between a user client of the application client and the database from the application client, the connection command comprising an indication of a context of the user client, assigning an application connection between the application client and the database to the user client in response to the connection command, and switching a context of the application connection to the context of the user client.

20 Claims, 5 Drawing Sheets

CONTEXT SWITCH OF DATABASE CONNECTIONS

CROSS-REFERENCE TO RELATED APPLICATIONS

This application claims the benefit of priority to United Kingdom Patent Application No. 1415023.9, filed Aug. 25, 2014, the entire contents of which are incorporated herein by reference.

TECHNICAL FIELD

The present disclosure relates to the data processing field. More specifically, this disclosure relates to the access to databases.

BACKGROUND

The background of the present disclosure is hereinafter introduced with the discussion of techniques relating to its context. However, even when this discussion refers to documents, acts, devices and the like, it does not suggest or represent that the discussed techniques are part of the prior art or are common general knowledge in the field relevant to the present disclosure.

Databases are commonly used to store large amount of data in structured form (for example, organized in tables in relational databases). Usually, before each client may access a generic database to perform any operations thereon (for example, to retrieve selected data), the client connects to the database by opening a corresponding connection. This involves the completion of all the arrangements that are required to allow the client to communicate with the database and to allow the database to process any operative command submitted thereto. Each connection is associated with a context that defines how the operative commands of the client are to be processed (for example, the identity of the client, assigned privileges and permissions).

The opening of any connection requires several operations that are relatively complex and time-consuming (for example, for authenticating the client); this may adversely affect the performance, especially when a few operative commands (down to a single one) are submitted to the database for each connection. Moreover, the connections waste a relatively high amount of resources (for example, memory space), even when they are inactive; therefore, most databases limit the maximum number of connections that may be open at the same time.

Often, the clients of the databases are software applications (referred to as application clients); in turn, each application client may be used by multiple users, such as physical persons (referred to as user clients) that access the database through the application client.

In this case, the application client may connect to the database on behalf of all its user clients; for this purpose, the application client always connects to the database with a corresponding context (i.e., its identity and highest possible privileges and permission), with the different privileges and permissions of the user clients that are then managed by the application client. In this way, it is also possible to exploit connection pooling techniques. For this purpose, a pool of connections (all with the same context of the application client) is created; whenever a connection is to be opened an available connection is instead retrieved from the pool and whenever a connection is to be closed it is instead returned to the pool (for example, by means of a connection wrapper that makes this behavior completely opaque to the application client). This allows reducing repeated openings and closings of the connections. However, the database is completely agnostic about the user clients actually accessing it.

Conversely, a connection to the database should be opened for each user client (with the corresponding context) to make the database aware of the user clients actually accessing it (for example, for security or logging purposes); however, this reduces the performance of the application client.

Alternatively, as described in U.S. Pat. No. 6,986,060 (the entire disclosure of which is herein incorporated by reference), a security context may be shared among different sessions on a database server. For this purpose, a function call may be used to record a context for an application client with the database server (for example, an application session between a user and an application). Another function call may then be used to associate the application client with a database session between the database server and the application. Whenever a request is receiver by the database server through the database session, the corresponding context is retrieved. A database operation required to satisfy the request is performed thereby enforcing access rights associated with this context (for example, by rewriting a query). This allows selectively switching a large number of application sessions among a smaller number of database sessions for connection pooling purposes.

Moreover, U.S. Pat. No. 8,549,038 as well (the entire disclosure of which is herein incorporated by reference) describes the sharing of a session; in this case, the session has a common context and a pluggable context that directly depends on the end user, the application and/or the privilege level.

However, the management of the different contexts at the level of the database requires a quite complex rewriting of the client applications; moreover, the sharing of the same connection by multiple application clients (with different contexts) may involve security exposures.

In addition, the article "Context transfer method through SQL for database security", IPCOM000137107D, Publication Date: 8 Jun. 2006 (the entire disclosure of which is herein incorporated by reference) describes a technique for transferring context information to a database. For this purpose, a query is modified so as not to change its result; particularly, the context information is attached to the query as a predicate that is always true.

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of switching the context.

Particularly, an aspect provides a method for accessing a database by an application client, wherein in response to a connection command (for opening a user connection between a user client of the application client and the database) an application connection (between the application client and the database) is assigned to the user client and its context is switched to a context of the user client.

A further aspect provides a computer program for implementing the method (and a corresponding computer program product).

A further aspect provides a corresponding system.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). Particularly.

DETAILED DESCRIPTION

Figure 1:
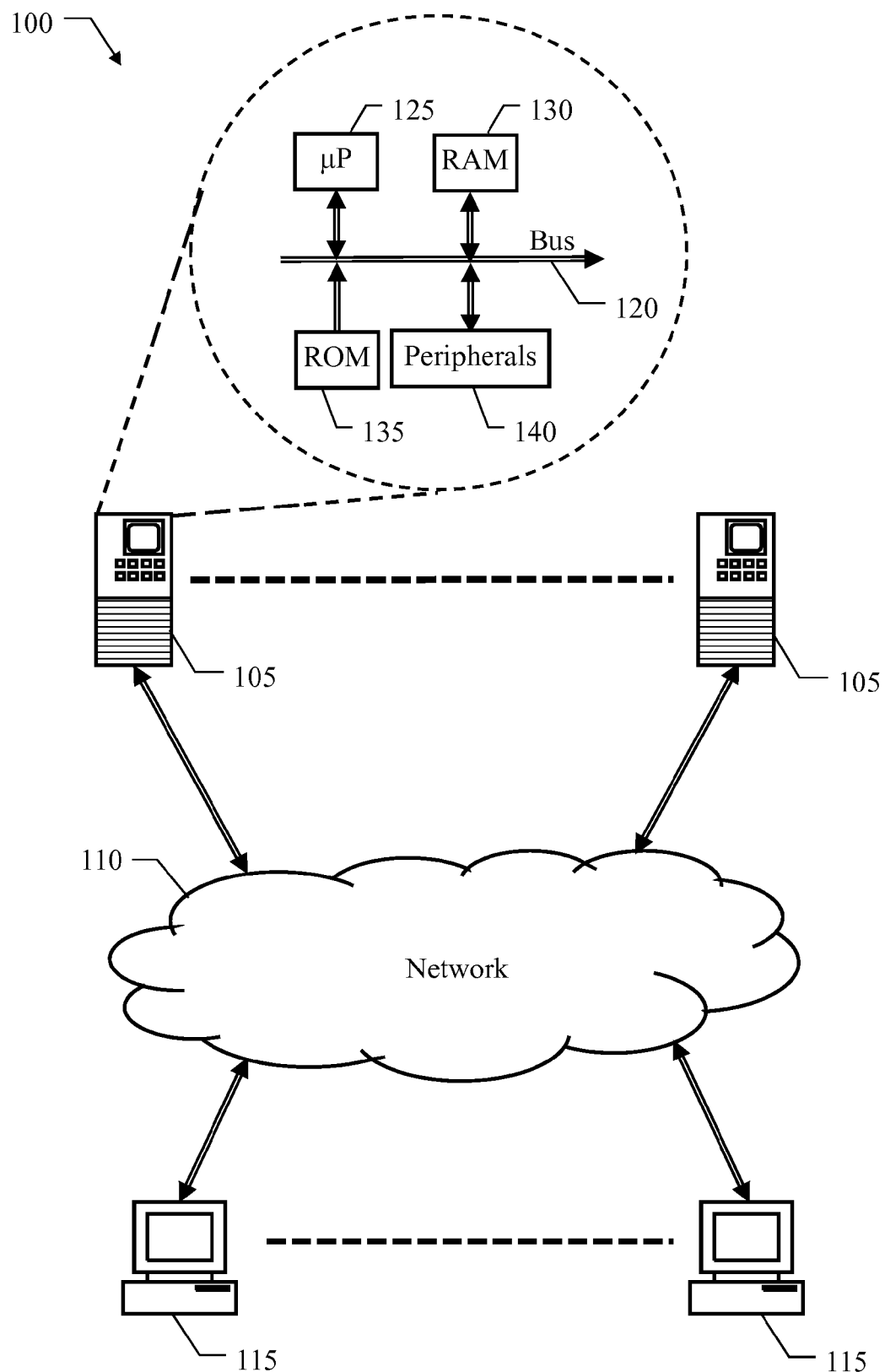
FIG. 1 shows a schematic block-diagram of a computing system that may be used to practice the solution according to an embodiment of the present disclosure.

With reference in particular to FIG. 1, a schematic block-diagram is shown of a computing system 100 that may be used to practice the solution according to an embodiment of the present disclosure.

The computing system 100 has a distributed architecture, typically based on the Internet; the Internet is formed by a large number of server computing machines (or simply servers) 105, which are connected one to another through a global communication network 110. A subset of the servers 105, known as World Wide Web (or simply web), allows accessing corresponding web sites (each one comprising a collection of web pages connected one to another through corresponding hyper-links, starting from a home page). Users of client computing machines (or simply clients) 115, for example, of the thin type, access the Internet (through access providers, not shown in the figure), in order to exploit the services offered by the servers 105. Particularly, in the context of the present disclosure the users access web (software) applications (exposing a web interface based on web pages) to perform different operations, which comprise the access to one or more databases.

The servers 105 are generally grouped in server farms (not shown in the figure). A generic server 105 is formed by several units that are connected in parallel to a bus structure 120. In detail, a set of (one or more) microprocessors (µP) 125 controls operation of the server 105; a RAM 130 is directly used as a working memory by the microprocessors 125, and a ROM 135 stores basic code for a bootstrap of the server 105. Moreover, the server 105 comprises different peripherals 140; particularly, the peripherals 140 comprise a mass-memory (implemented by one or more storage units of the server farm) and a network adapter (which is used to plug the server 105 into the server farm, at the same time allowing it to access the communication network 110).

Figure 2A:
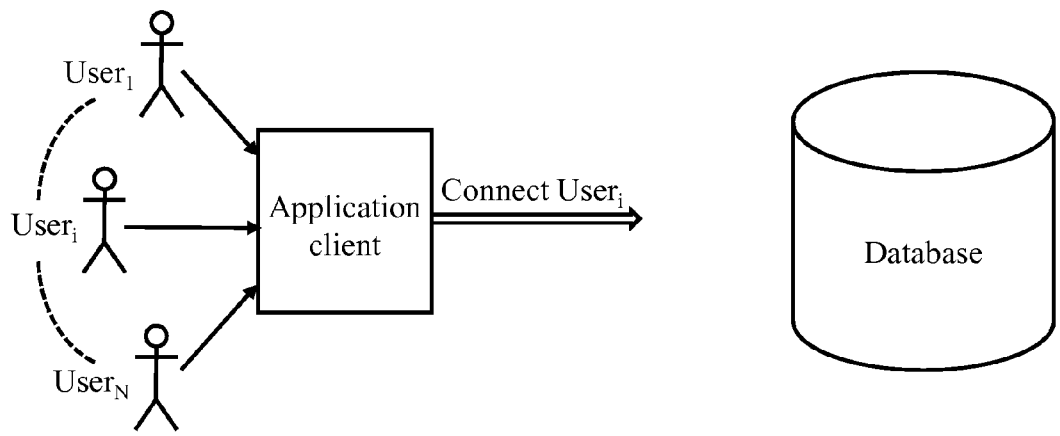
FIG. 2A-FIG. 2C show an exemplary application of the solution according to an embodiment of the present disclosure.
Figure 2B:
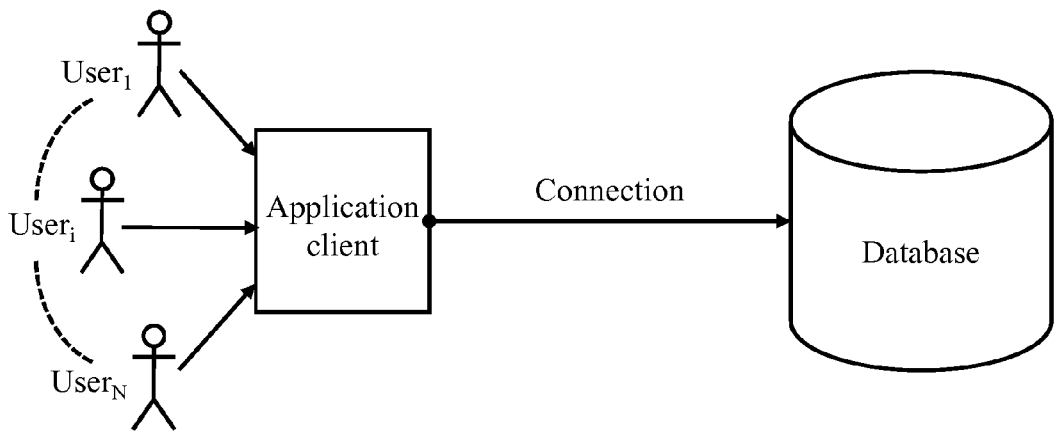
Figure 2C:
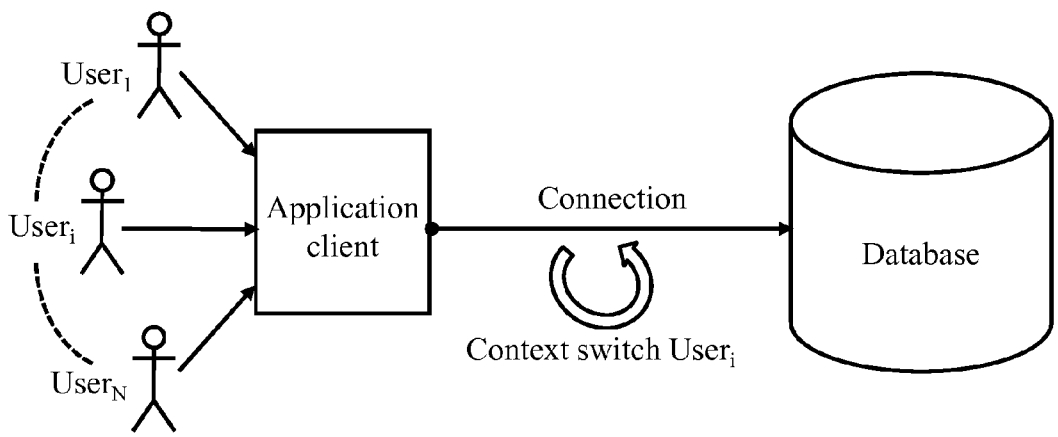

With reference now to FIG. 2A-FIG. 2C, an exemplary application is shown of the solution according to an embodiment of the present disclosure.

A generic (software) application client (for example, a web application) is used to accesses a database (or more) by multiple user clients thereof (for example, physical persons logging in the web application). Whenever each user client has to access the database, the application client submits a connection command thereto for opening a corresponding (user) connection between the user client and the database; the connection command comprises an indication of a context of the user client, defining how any operative commands of the user client (for performing actual operations on the database) are to be processed (for example, the identity of the user client, assigned privileges and permissions).

Moving to FIG. 2B, in the solution according to an embodiment of the present disclosure, in response thereto an (application) connection between the application client and the database is assigned to the user client (for example, by retrieving it from a corresponding pool of available connections).

Moving to FIG. 2C, the context of this connection is switched to the context of the user client (for example, by submitting a corresponding switching command to the database).

As a result, multiple user clients may be switched throughout one or more connections of the application client, with a beneficial effect on the performance; at the same time, the database is aware of the user clients actually accessing it (for example, for security or logging purposes).

This is completely opaque to the application client (which may continue submitting connections commands for its user clients); therefore, no rewriting of the application client is required, so that the above-mentioned solution may be readily applied to any existing application client.

At the same time, the risk of any security exposure is significantly reduced, since the connection is actually assigned to the user client (with the switch of its context) and it is not shared among multiple user clients.

Figure 3:
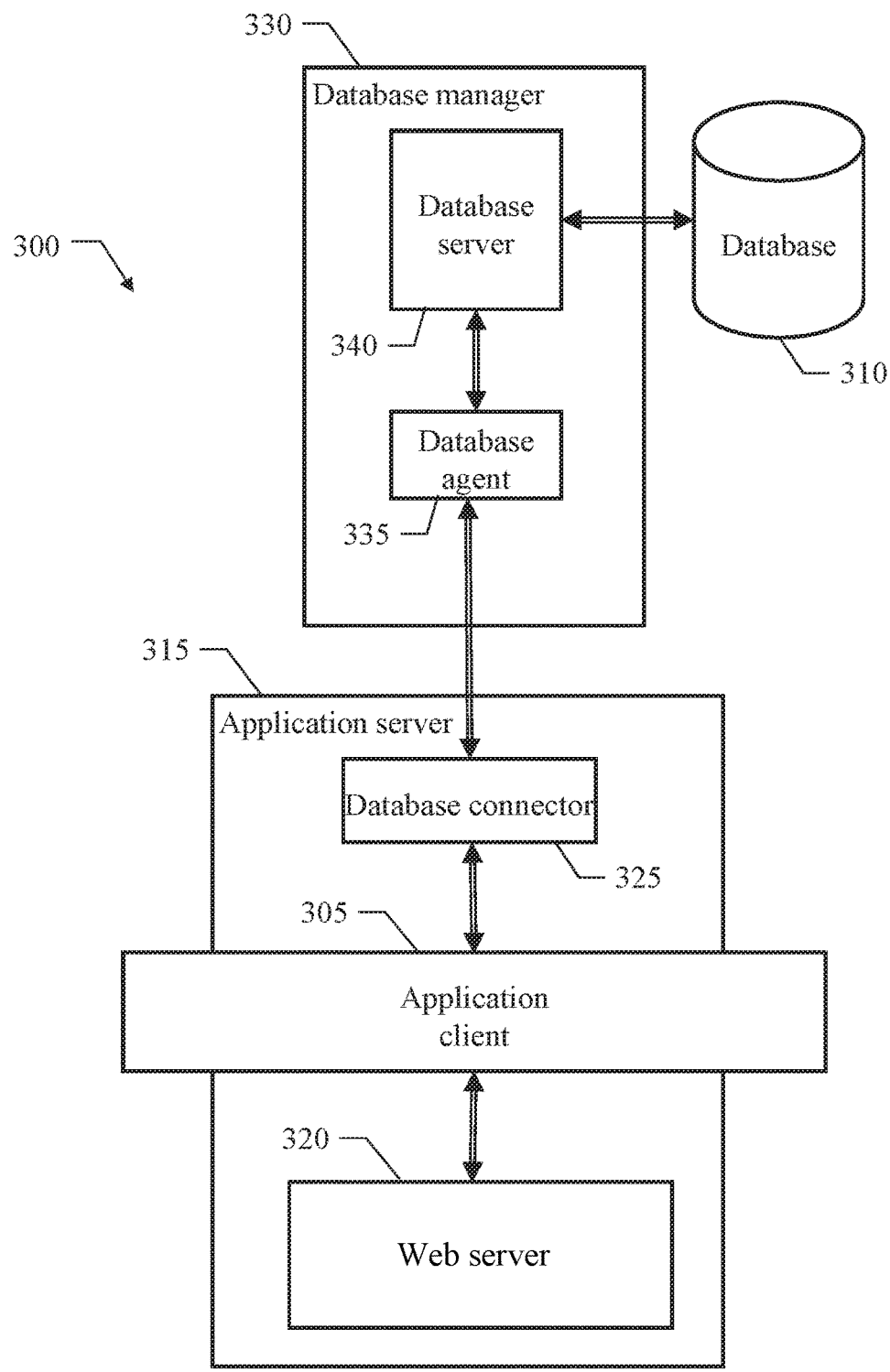
FIG. 3 shows the main software components that may be used to implement the solution according to an embodiment of the present disclosure.

With reference now to FIG. 3, the main software components are shown that may be used to implement the solution according to an embodiment of the present disclosure.

Particularly, all the software components (programs and data) are denoted as a whole with the reference 300. The software components 300 are typically stored in the mass memory and loaded (at least partially) into the working memory of one or more (physical or virtual) servers when the programs are running. The programs are initially installed into the mass memory, for example, from removable storage units or from the communication network. In this respect, each software component may represent a module, segment or portion of code, which comprises one or more executable instructions for implementing the specified logical function.

More specifically, a generic application client (denoted with the reference 305) accesses a database, or more (denoted with the reference 310). In the example at issue, the application client 305 is a web application (for example, an account, warehouse, purchasing or sale web application) that runs in an application server 315 providing a framework for developing and executing web applications (for example, "IBM Websphere" by IBM Corporation, trademarks thereof). Particularly, as it is relevant to the present disclosure, the application server 315 comprises a web server 320 that passes every request submitted by the user clients through their web browsers (not shown in the figure) to the application client 305 and returns corresponding responses thereto. Moreover, the application server 315 comprises a database connector 325 (for example, compliant to the Open Database Connectivity, or ODBC, specification) that provides a comprehensive set of utilities for accessing one or more types of databases (each one by means of a specific driver encapsulating the required logic), comprising the database 310.

For this purpose, the database connector 325 interacts with a database manager 330 that provides a logical view of the database 310 hiding its physical implementation (for example, a Relational Database Management System, or RDBMS, when the database 310 is of the relational type, such as "IBM DB2" by IBM Corporation, trademarks thereof). Particularly, the database manager 330 comprises a database agent 335 that runs in the background for serving any command submitted to the database manager 330 (for example, by implementing parsing and caching functions); the database agent 335 interacts with a database server 340, which actually performs the required operations on the database 310.

Figure 4A:
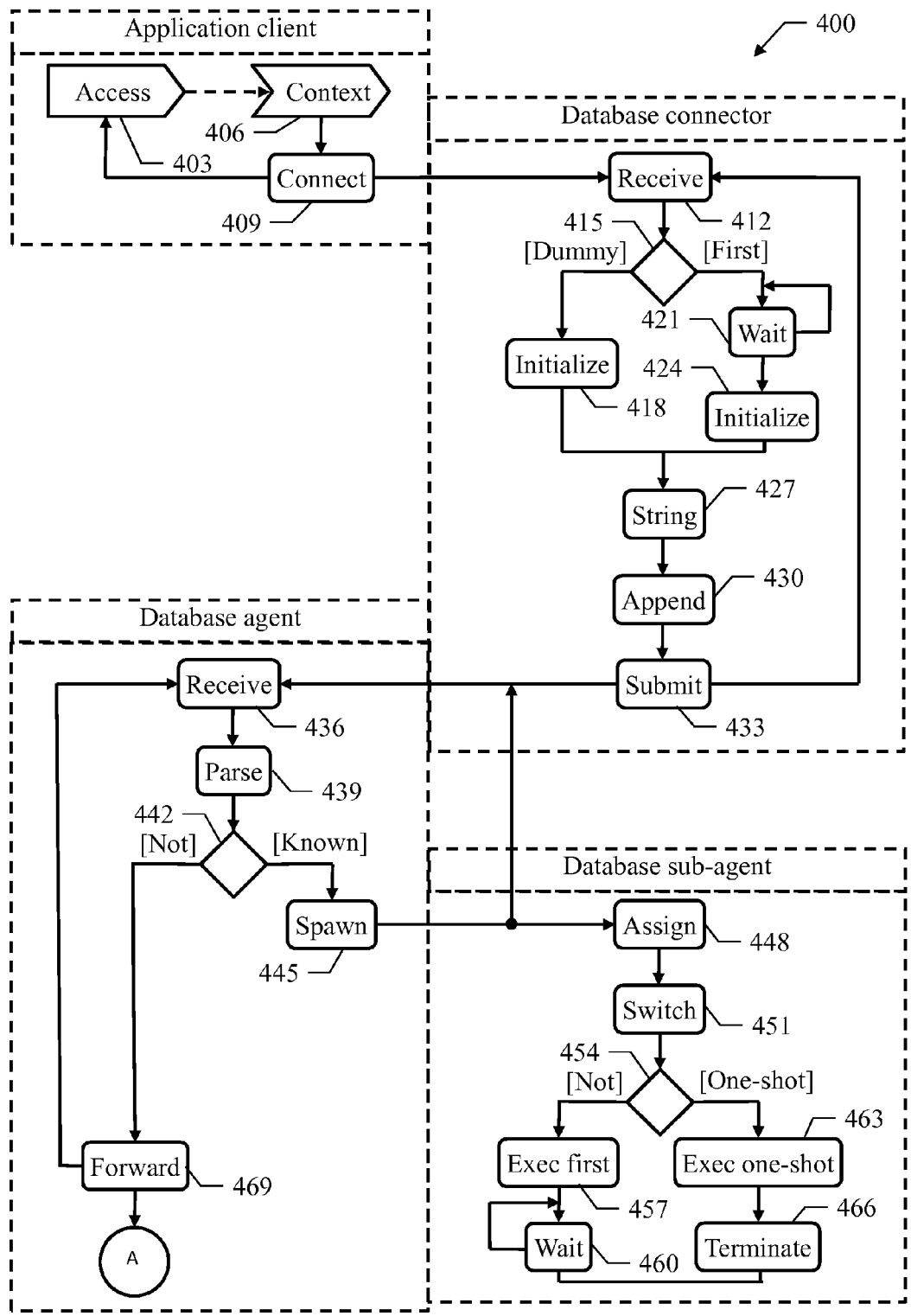
FIG. 4A-FIG. 4B show an activity diagram describing the flow of activities relating to an implementation of the solution according to an embodiment of the present disclosure.
Figure 4B:
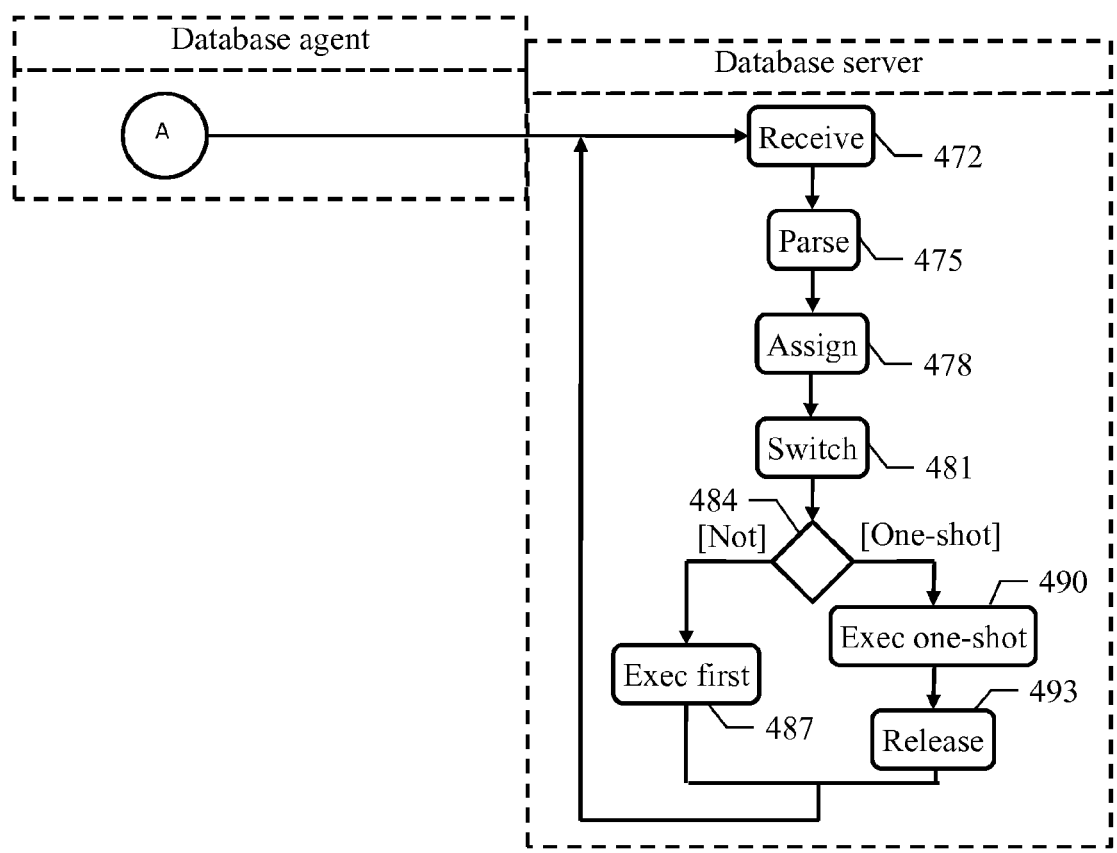

With reference now to FIG. 4A-FIG. 4B, an activity diagram is shown describing the flow of activities relating to an implementation of the solution according to an embodiment of the present disclosure.

Particularly, the diagram represents an exemplary process for accessing a generic database by an application client with a method 400. In this respect, each block may represent one or more executable instructions for implementing the specified logical function on the above-mentioned server(s).

More specifically, the process passes from block 403 to block 406 in the swim-lane of the application client whenever a generic user client thereof needs to access the database for performing one or more operations thereon (for example, updating or retrieving selected data). In response thereto, the application client retrieves information defining the context of the user client (for example, from a dedicated file). For example, the context information comprises authentication credentials (such as ID and password), security settings (for example, privileges to access and permissions to read/write data), result formats (for example, language, currency). Passing to block 409, a connection command for connecting to the database by opening a (user) connection for the user client is submitted to the database connector. The connection command comprises an indication of the database (for example, its type defined by the name of a corresponding driver and its location defined by a corresponding URL) and of the context information of the user client (for example, in the form of one or more key/value pairs, such as userName=myUserName, password=myPassword); optionally, the connection command may also comprise an indication of a single operative command (referred to as one-shot command) to be executed on the database by the user client in the corresponding connection (for example, an SQL statement for updating selected data, such as UPDATE myWriteTable SET myWriteColumn=myWriteValue). The flow of activity then returns to the block 403 for continuing the execution of the application client.

Moving to the swim-lane of the database connector at block 412, the connection command is received from the application client. The flow of activity branches at block 415 according to a configuration of the database connector. In an implementation, a switching command is initialized at block 418 to a (predefined) dummy command for the database. The dummy command is chosen to be syntactically correct (for example, UPDATE Context FROM Connection); the dummy command may also indicate a type of switching of the context (for example, with different switching commands for switching types indicating corresponding implementation versions). Referring back to block 415, in a different implementation (with no one-shot command) the database connector enters an idle loop at block 421 waiting for a first operative command submitted by the application client in its connection (for example, an SQL query for retrieving selected data, such as SELECT * FROM myReadTable WHERE myReadColumn=myReadValue). As soon as the database connection receives this first operative command, the switching command is initialized to it at block 424.

The flow of activity merges again at block 427, from either the block 418 or the block 424; at this point, a switching string indicating the context switch is created. The switching string is in the form of a predicate that is always true (i.e., a tautology). For this purpose, when the switching command is defined by the dummy command the switching string may be set to the condition that the context information is different from the one-shot command, by default equal to an empty string when it is missing (for example, "userName=myUserName, password=myPassword"< >"myOneShotCommand" or "userName=myUserName, password=myPassword"< >" ", respectively); instead, when the switching command is defined by the first operative command (with no one-shot command), the switching string may be set to the condition that the switching type (for example, indicated by the same dummy command as above) is different from the context information (for example, "UPDATE Context FROM Connection"< >"userName=myUserName, password=myPassword").

Continuing to block 430, the switching string is appended to the switching command as a predicate thereof. For this purpose, when the switching command has no predicate, a predicate clause with the switching string (for example, a WHERE clause in SQL) is added to the switching command (for example, UPDATE Context FROM Connection WHERE "userName=myUserName, password=myPassord"< >"myOneShotCommand" for the dummy command and SELECT * FROM myReadTable WHERE "UPDATE Context FROM Connection"< >"userName=myUserName, password=myPassord" for the first command); when instead the switching command already has a predicate clause, the switching string is added to it in logical AND (for example, SELECT * FROM myReadTable WHERE myReadColumn=myReadValue AND "UPDATE Context FROM Connection"< >"userName=myUserName, password=myPassord"). The database connector submits the switching command so obtained to the database agent at block 433. The flow of activity then returns to the block 412 waiting for the submission of a next connection command.

In this way, the addition of the switching string does not change the result of the switching command, so that it is completely opaque to its (possible) execution. Therefore, the same application client may also connect to databases that do not support the above-described technique. Indeed, in this case the database connector always bases the switching command on the first operative command; therefore, the switching command is processed normally by performing the same operation of the (original) first operative command (but without performing any context switch).

Continuing to block 439, the database agent verifies whether the received command is a switching command that the database agent is capable of processing; for this purpose, the database agent parses the received command looking for every switching type that is known thereto (for example, UPDATE Context FROM Connection). The flow of activity branches at block 442 according to the result of the parsing. If the received command comprises a known switching type, it is recognized as a switching command at block 445; in response thereto, the database agent spawns (in a child process of the process executing the database agent and then inheriting its environment) a database sub-agent for the user client; at the same time, the database agent passes the context information and the one-shot command, if any (as extracted from the switching string of the switching command) to the database sub-agent. The database agent then continues its execution asynchronously, by returning to the block 436 waiting for the submission of a next switching command.

In this way, the database agent simply operates as a dispatcher of the switching commands with a beneficial effect on the performance (since this limits the risk of creating a bottleneck at the database agent by distributing the workload relating to the actual management of the switching commands throughout the database sub-agents).

Moving now to the swim-lane of the database sub-agent at block 448, an available (application) connection between the application client and the database is retrieved from a corresponding pool of connections (shared with the parent process of the database agent); the retrieved connection it then assigned to the client user. With reference to block 451, the context of the connection is switched to the context of the user client as indicated in the context information (for example, by setting one or more corresponding environmental variables accordingly). A test is then made at block 454 to verify whether the one-shot command has been received. If no one-shot command has been received, the switching command (when defined by the first operative command) is executed at block 457 in the connection of the user client. The database sub-agent then enters a waiting condition at block 460 for any (next) operative command to be executed in the connection of the user client (submitted by the application client to the database connector, which forwards it to the database agent, which in turn forwards it to the corresponding database sub-agent). In this way, each (first/next) operative command is executed with the context of the user client (enforced by the database sub-agent that then forwards it to the database server); for example, the database sub-agent may log the identity of the user client, may limit the access to the database according to his/her permission (such as by rewriting any query accordingly), may control the access to the database according to his/her permissions, may format any retrieved data accordingly. The database sub-agent remains active until the application client submits a disconnection command to the database connector for closing the connection of the user client; in response thereto, the database connector creates a release command for the connection of the user client, which release command comprises another dummy command indicating the same switching type and the connection of the user client. The database connector submits the release command to the database agent; in response thereto, the database agent (when the switching type is known to it) terminates the database sub-agent of the user client, thereby returning its connection to the pool (to make it available for other user clients). Referring back to the block 454, if the one-shot command has been received, the database sub-agent executes it at block 463 in the connection of the user client as above. The child process of the database sub-agent is then terminated at block 466 (so that its connection is immediately released returning to the pool).

Referring back to the block 442 in the swim-lane of the database agent, if the received command does not comprise any known switching type (i.e., it is a switching/releasing command that the database agent is not capable of processing or it is not a switching/releasing command), the received command is forwarded to the database server at block 469. The flow of activity then returns to the block 436 waiting for the submission of a next command.

Moving to the swim-lane of the database server, the switching command is received from the database agent at block 472. Continuing to block 475, the database server recognizes the switching command from its parsing (i.e., when it comprises every known switching type, for example, UPDATE Context FROM Connection), and it extracts the context information and the one-shot command, if any. Similar operations as above are now performed directly by the database server. Particularly, at block 478 an available (application) connection between the application client and the database is retrieved from the corresponding pool and it is assigned to the user client. With reference to block 481, the context of the connection is switched to the context of the user client as indicated in the context information. A test is then made at block 484 to verify whether the one-shot command has been received. If no one-shot command has been received, the switching command (when defined by the first operative command) is executed at block 487 in the connection of the user client. The flow of activity then returns to the block 472 waiting for the submission of a next switching command. In this case as well, the database server receives any (next) operative command to be executed in the connection of the user client (submitted by the application client to the database connector, which forwards it to the database agent, which in turn forwards it to the database server). As above, each (first/next) operative command is executed with the context of the user client (directly enforced by the database server now). The connection of the user client remains assigned thereto until the application client submits the disconnection command to the database connector (which creates the corresponding release command and submits it to the database agent, which in turn forwards it to the database server, which then returns the connection to the pool).

The connection of the user client is then immediately released at block 493 (by returning it to the pool). The flow of activity again returns to the block 472 waiting for the submission of a next switching command.

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation) should be intended as any entity or structure adapted or configured for carrying out the relevant function.

For example, an embodiment provides a method for accessing a database by an application client. The method comprises the following steps. A connection command is received for opening a user connection (between a user client of the application client and the database) from the application client; the connection command comprises an indication of a context of the user client. An application connection (between the application client and the database) is assigned to the user client in response to the connection command. A context of the application connection is switched to the context of the user client.

However, the database may be of any type (for example, an object-oriented database) and it may be accessed in any way (either remotely or locally) by any application client (for example, a stand-alone software application). The connection command may be of any type (for example, NoSQL) for any user client (for example, another software application); the connection command may comprise any indication of the context of the user client, which context may be defined by only parts of the above-mentioned pieces of information, or by different, additional or alternative pieces of information. The application connection may be assigned to the user client in any way (even without any pooling technique). The context of the application connection may be switched in any way (see below).

In an embodiment, the method further comprises generating a switching command (for assigning the application connection to the user client and switching the context of the application connection to the context of the user client) according to the connection command, and submitting the switching command to the database.

However, the switching command may have any format (see below); moreover, the connection command (and the disconnection command) may be simply forwarded to the database (without generating any switching/releasing command) when it does not support the above-described technique. In any case, nothing prevents controlling the assignment of the application connection and its context switch directly by the database.

In an embodiment, said receiving a connection command, creating a switching command and submitting the switching command are performed by a database connector comprising a driver for the database.

However, the database connector may be of any type, either supporting multiple types of database or specific for a single one only (for example, Java Database Connectivity, or JDBC); in any case, the same operations may also be performed by a native interface of the database (for example, Command Line Processor, or CLP, for DB2).

In an embodiment, the method further comprises the following steps. The switching command is received by a database agent of the database. In response to a positive recognition of the switching command by the database agent, a database sub-agent is spawn by the database agent, and said step of assigning an application connection and said step of switching a context are performed by the database sub-agent; conversely, in response to a negative recognition of the switching command by the database agent, the switching command is forwarded to a database server, and said step of assigning an application connection and said step of switching a context are performed by the database server.

However, the choice of processing the switching command by the database agent or by the database server may be based on different, additional or alternative criteria (for example, their workload or the complexity of the context information). In any case, nothing prevents implementing the same technique only in the database agent, only in the database server, or more generally in any other way (for example, in corresponding threads of a single process).

In an embodiment, said step of generating a switching command comprises initializing the switching command to a dummy command for the database.

However, the dummy command may be of any type (even NoSQL); moreover, it is possible to use any number of dummy commands for whatever types of context switch (for example, differentiated according to the operations to be performed for switching the context), down to a single one for all the types of context switch.

In an embodiment, said step of generating a switching command comprises initializing the switching command to a first operative command received from the application client in the user connection.

However, the possibility is not excluded of having an implementation that is only based on the dummy command, only on the first operative command, on both of them (for example, based on the dummy command when the one-shot command is received or on the first operative command otherwise), or more generally on any other switching command (even based on a dedicated command different from the ones normally used to access the database).

In an embodiment, said step of generating a switching command comprises creating a switching string defining a tautology comprising the indication of the context of the user client, and appending the switching string as a predicate to the switching command. The method further comprises executing the switching command after said step of switching a context.

However, the switching string may be generated in any way to define a tautology (for example, with conditions in logical AND, each on defining that a corresponding piece of information defining the context of the user client is different from a null string), and it may be appended to the switching command to define a predicate thereof in any way (according to a syntax of the language that is supported by the database). Moreover, the switching command may be executed in any way (for example, only when the switching command is based on the first operative command or always, either as is or after removing the switching string). In any case, the possibility of passing the context of the user client in a different way is not excluded (for example, in dedicated parameters of the switching command).

In an embodiment, the connection command further comprises an indication a one-shot command, which is a single operative command to be executed on the database by the user client in the user connection; the method further comprises executing the one-shot command in the application connection switched to the context of the user client, and releasing the application connection.

However, the one-shot command may be either a simple operative command or a complex operative command (comprising multiple simple operative commands). Moreover, the execution of the one-shot command may be implemented in any way (for example, adding the one-shot command to the switching command when it is defined by the first operative command as well). In any case, this feature may also be not supported in a basic implementation (with the operative commands that are always submitted separately after connecting to the database) or it may be the only supported one.

In an embodiment, said step of releasing the application connection comprises terminating the database sub-agent.

However, the application connection may be released in any way (for example, by actually closing it or by saving its context before switching it to the context of the user client and then restoring the saved context after the execution of the one-shot command); moreover, this operation may be performed by any module (for example, the database sub-agent before terminating, the database agent, the database server).

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

A further embodiment provides a computer program, which is configured for causing a computing system to perform the steps of the above-described method. A further embodiment provides a computer program product comprising a non-transitory computer readable medium embodying a computer program, which computer program is loadable into a working memory of a computing system thereby configuring the computing system to perform the same method.

However, the computer program may be implemented as a stand-alone module, as a plug-in for a pre-existing software program (for example, a database connector or a database manager), or even directly in the latter. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in base-band or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the relevant computer, as a stand-alone software package, partly on this computer and partly on a remote computer or entirely on the remote computer. In the latter scenario, the remote computer may be connected to the computer through any type of network, including a local area network (LAN) or a wide area network (WAN), or the connection may be made to an external computer (for example, through the Internet using an Internet Service Provider). Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A further embodiment provides a system comprising means configured for performing the steps of the same method.

However, the method may also be carried out on a system based on a different architecture (for example, a local, wide area, global, cellular or satellite network), and exploiting any type of (wired and/or wireless) connections. However, its implementation on a stand-alone computer is not excluded. In any case, each computing machine used to implement the method may have another structure or may comprise similar elements; moreover, it is possible to replace the computing machine with any code execution entity, based on either a physical machine or a virtual machine, or any combination thereof.

Generally, similar considerations apply if the system has a different structure or comprises equivalent components, or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The invention claimed is:

1. A method for accessing a database by an application client, the method comprising:
   receiving a connection command for opening a user connection between a user client of the application client and the database from the application client, the connection command comprising an indication of a context of the user client;
   assigning an application connection between the application client and the database to the user client in response to the connection command;
   switching a context of the application connection to the context of the user client;
   generating a switching command, for assigning the application connection to the user client and switching the context of the application connection to the context of the user client, according to the connection command, wherein generating the switching command includes creating a switching string defining a tautology comprising the indication of the context of the user client and appending the switching string as a predicate to the switching command;
   submitting the switching command to the database; and
   executing the switching command after switching the context.

2. The method according to claim 1, wherein receiving the connection command, generating the switching command, and submitting the switching command are performed by a database connector that receives the connection command from the application client.

3. The method according to claim 1, further comprising:
   receiving the switching command by a database agent of the database;
   in response to a positive recognition of the switching command by the database agent:
     spawning a database sub-agent by the database agent, wherein assigning the application connection and switching the context are performed by the database sub-agent, or
   in response to a negative recognition of the switching command by the database agent:
     forwarding the switching command to a database server,
     wherein assigning the application connection and switching the context are performed by the database server.

4. The method according to claim 3, wherein the connection command further comprises an indication of a one-shot command being a single operative command to be executed on the database by the user client in the user connection, the method further comprising:
   executing the one-shot command in the application connection switched to the context of the user client; and
   releasing the application connection.

5. The method according to claim 4, wherein releasing the application connection comprises:
   terminating the database sub-agent.

6. The method according to claim 1, wherein generating the switching command comprises:
   initializing the switching command to a dummy command for the database.

7. The method according to claim 1, wherein generating the switching command comprises:
   initializing the switching command to a first operative command received from the application client in the user connection.

8. A computer program product for accessing a database by an application client, the computer program product comprising a non-transitory computer usable storage medium embodied with instructions configured to perform steps of:
   receiving a connection command for opening a user connection between a user client of the application client and the database from the application client, the connection command comprising an indication of a context of the user client;
   assigning an application connection between the application client and the database to the user client in response to the connection command;
   switching a context of the application connection to the context of the user client;
   generating a switching command, for assigning the application connection to the user client and switching the context of the application connection to the context of the user client, according to the connection command, wherein generating the switching command includes creating a switching string defining a tautology comprising the indication of the context of the user client and appending the switching string as a predicate to the switching command;
   submitting the switching command to the database; and
   executing the switching command after switching the context.

9. The computer program product of claim 8, wherein receiving the connection command, generating the switching command, and submitting the switching command are performed by a database connector that receives the connection command from the application client.

10. The computer program product of claim 8, wherein the instructions are further configured to perform steps of:
    receiving the switching command by a database agent of the database;

in response to a positive recognition of the switching command by the database agent:
spawning a database sub-agent by the database agent, wherein assigning the application connection and switching the context are performed by the database sub-agent, or
in response to a negative recognition of the switching command by the database agent:
forwarding the switching command to a database server,
wherein assigning the application connection and switching the context are performed by the database server.

11. The computer program product of claim 10, wherein the connection command further comprises an indication of a one-shot command being a single operative command to be executed on the database by the user client in the user connection, the method further comprising:
executing the one-shot command in the application connection switched to the context of the user client; and
releasing the application connection.

12. The computer program product of claim 8, wherein generating the switching command comprises:
initializing the switching command to a dummy command for the database.

13. The computer program product of claim 8, wherein generating the switching command includes:
initializing the switching command to a first operative command received from the application client in the user connection.

14. A system comprising a data processor coupled to a storage device comprising instructions configured to perform steps of:
receiving a connection command for opening a user connection between a user client of the application client and the database from the application client, the connection command comprising an indication of a context of the user client;
assigning an application connection between the application client and the database to the user client in response to the connection command;
switching a context of the application connection to the context of the user client;
generating a switching command, for assigning the application connection to the user client and switching the context of the application connection to the context of the user client, according to the connection command, wherein generating the switching command includes creating a switching string defining a tautology comprising the indication of the context of the user client and appending the switching string as a predicate to the switching command;
submitting the switching command to the database; and
executing the switching command after switching the context.

15. The system of claim 14, wherein receiving the connection command, generating the switching command, and submitting the switching command are performed by a database connector that receives the connection command from the application client.

16. The system of claim 14, wherein the instructions are further configured to perform steps of:
receiving the switching command by a database agent of the database;
in response to a positive recognition of the switching command by the database agent:
spawning a database sub-agent by the database agent, wherein assigning the application connection and switching the context are performed by the database sub-agent, or
in response to a negative recognition of the switching command by the database agent:
forwarding the switching command to a database server,
wherein assigning the application connection and switching the context are performed by the database server.

17. The system of claim 16, wherein the connection command further comprises an indication of a one-shot command being a single operative command to be executed on the database by the user client in the user connection, the method further comprising:
executing the one-shot command in the application connection switched to the context of the user client; and
releasing the application connection.

18. The system of claim 17, wherein releasing the application connection comprises: terminating the database sub-agent.

19. The system of claim 14, wherein generating the switching command comprises:
initializing the switching command to a dummy command for the database.

20. The system of claim 14, wherein generating the switching command includes:
initializing the switching command to a first operative command received from the application client in the user connection.

* * * * *